United States Patent
Ennis et al.

Patent Number: 5,519,558
Date of Patent: May 21, 1996

[54] THREE PHASE THROTTLE CURRENT TECHNIQUE

[75] Inventors: Ralph M. Ennis, Morgantown, W. Va.; James A. Trax, Coraopolis; Yun-Ko N. Chien, Murrysville, both of Pa.

[73] Assignee: Eaton Corporation, Cleveland, Ohio

[21] Appl. No.: 176,157

[22] Filed: Dec. 30, 1993

[51] Int. Cl.$^6$ .................................................. H02H 5/04
[52] U.S. Cl. ............................... 361/31; 361/93; 361/103
[58] Field of Search .................................... 361/103, 106, 361/93, 94, 58, 119, 23–25, 28–31

[56] References Cited

U.S. PATENT DOCUMENTS

| | | | |
|---|---|---|---|
| 4,178,618 | 12/1979 | Khalid | 361/58 |
| 4,475,138 | 10/1984 | Middleman et al. | 361/58 |
| 4,683,515 | 7/1987 | Beihoff et al. | 361/106 |

*Primary Examiner*—A. D. Pellinen
*Assistant Examiner*—Michael J. Sherry
*Attorney, Agent, or Firm*—Martin J. Moran

[57] ABSTRACT

A current throttle resistor external to a contactor device protects an electrical power distribution circuit coupling a load to a power line. The contactor has electrical switching contacts in series with the load and the line, and for example, an electromagnetically controllable switch for opening the contacts. A current sensor is coupled to the controllable switch for opening of the contacts upon occurrence of a high current fault in the power distribution circuit exceeding a predetermined threshold. A resistive element in series with the power distribution circuit between the line and the load, provides a voltage drop for limiting current during the high current fault. The resistive element can be a nichrome strip or similar positive temperature coefficient resistance having a low cool resistance, and is thermally isolated from the controllable switch by mounting in a resistor housing external to the contactor. To maximize resistance and minimize space, the nichrome strip is bent in an elliptical arc between two leads that protrude from the resistor housing, for coupling into the circuit on the load side of the contactor.

7 Claims, 4 Drawing Sheets

THREE PHASE THROTTLE CURRENT TECHNIQUE

BACKGROUND OF THE INVENTION

1. Field of the Invention

The invention relates to the field of electrical over-current protection, and in particular concerns a resistance device to be placed in series with a circuit breaker and load, for limiting the current passed by the breaker at the onset of a fault such as a short circuit.

2. Prior Art

Devices for protecting electrical circuits and loads from current fault conditions are often associated with controllable contactors that couple the load to the power line. In AC motor applications, the contactor arrangement is generally called a motor starter. In a general power distribution network, such contactors are usually called circuit breakers. In a multi-phase circuit, the contactor may have a plurality of associated contact sets, typically operated electromagnetically to connect and disconnect the load and the power line.

In addition to on/off controls for coupling and decoupling the load and the line, a sensing circuit typically monitors the current passing through the contacts from the line to the load. The sensing circuit produces a trip signal that triggers decoupling of the load from the line in the event of a detected fault condition.

Circuit protective devices may respond to fault conditions such as short term excess current due to a short circuit, long term excess current indicating overloading, a ground fault, phase imbalance or the like. Circuits for detecting such faults typically comprise some form of threshold responsive element generating a triggering signal that causes the contactor to disengage the power line. In modern contactors, a microprocessor or other logic control device may be included, for coordinating the operation of contactors in related circuits.

It is generally undesirable to have the contactor trip circuits be so sensitive as to trip immediately upon the current reaching a threshold as detected by a change of state on the output of the threshold responsive current sensing element, i.e., at the least pulse on the trip signal. Such a pulse may be an anomaly such as a noise spike, that does not represent a real fault condition. Trip circuits are advantageously designed to trigger more slowly than they might, in order to reduce the incidence of nuisance trips due to such anomalies. The threshold responsive sensing means associated with the contactor(s), for example a current threshold sensor, is therefore arranged with certain timing considerations. A direct short circuit as detected by sensing load current over a high current threshold may generate a trip relatively more promptly, and a lower current threshold that remains for a predetermined time may indicate a thermal overload and can also generate a trip. However, even for a relatively fast high current threshold device, a current level over the predetermined threshold level subsists for some minimum time as the state of the sensing device switches, the necessary drive signal is generated and the contacts are physically separated to break the circuit.

During the time between the onset of a current fault and the breaking of the circuit, there is a potential for damage to the contactor apparatus, to the load device and/or to the power distribution lines, for example due to resistive heating and due to arcing. Once established, a high current level also causes an inductive voltage surge as the protective contacts open, which may cause arcing across the contacts. In an extreme case, the contacts can weld together due to arcing, necessitating a trip at a point more proximal to the power source. Arcing erodes the contacts, and over a number of successive trips, the point at which the contacts abut one another may be changed by this erosion, affecting the mechanical operation of the contactor. This problem is acute in high power distribution systems.

In the event of a direct short circuit on the load side of a contactor, there is very little parallel resistance between the power line conductors. It is possible to reduce the level of short circuit current by placing a resistance in series with the contacts and the load. Whereas the resistance of the load is many times higher than the short circuit resistance of the conductors, the current limiting series resistance can be small, and does not dissipate a great deal of power or substantially affect the load. When the load is nominally operational, most of the line voltage is across the load. When the load resistance is shunted by a short circuit, most of the line voltage is across the current limiting series resistor.

Use of a current limiting series resistor thus reduces the short circuit current and protects the contacts of the contactor as they are opened during a fault. Although the series resistance is small, there is a voltage drop across the series resistance and a dissipation of energy in the form of heat. Of course when a fault occurs and the current level increases, there is a corresponding increase in the heat dissipated by the current limiting series resistor. This heat is a problem in itself, and may cause damage to the contactor or, in the event the contactor includes solid state elements or logic devices, may produce thermal runaway that causes switching elements and logic elements to continue to conduct when they should turn off.

According to the present invention, a protective series resistance is disposed in a housing external to the contactor housing, and includes a positive temperature coefficient resistance such as a nichrome strip. Nichrome material is known for resistance heaters. The resistance of the element is minimal when cool. When heated, particularly to a red hot condition, the resistance increases substantially. Whereas the protective resistance is disposed in an external housing defining a resistance furnace or lamp that is thermally isolated from the contactor housing, the heat dissipated therein is kept away from the contactor and its control logic, improving the effectiveness and reliability of the contactor device while protecting the load and associated conductors from damage.

SUMMARY OF THE INVENTION

It is an object of the invention to provide a positive temperature coefficient protective resistance element for a circuit protective device, that dissipates heat in a housing that is thermally insulated from the control and switching portions of the device.

It is another object of the invention to place an isolated nichrome or similar resistance element, having a cool resistance substantially smaller than that of an associated electrical load, in series with the load and a protective contactor, for limiting current in the event of a high current fault.

It is still another object of the invention to maximize the resistance of a protective resistance element while minimizing its dimensions, and while maintaining a uniform cross section so as to minimize uneven heat dissipation.

These and other objects are accomplished by a current throttle resistor external to a contactor device for protecting an electrical power distribution circuit coupling a load to a power line. The contactor has electrical switching contacts in series with the load and the line, and for example, an electromagnetically controllable switch for opening the contacts. A current sensor is coupled to the controllable switch for opening of the contacts upon occurrence of a high current fault in the power distribution circuit exceeding a predetermined threshold. A resistive element in series with the power distribution circuit between the line and the load, provides a voltage drop for limiting current during the high current fault. The resistive element can be a nichrome strip or similar positive temperature coefficient resistance having a low cool resistance, and is thermally isolated from the controllable switch by mounting in a resistor housing external to the contactor. To maximize resistance and minimize space, the nichrome strip is bent in an elliptical arc between two leads that protrude from the resistor housing, for coupling into the circuit on the load side of the contactor.

These and other aspects of the invention will be apparent in connection with the following discussion of specific examples and embodiments, with reference to the appended illustrations thereof.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
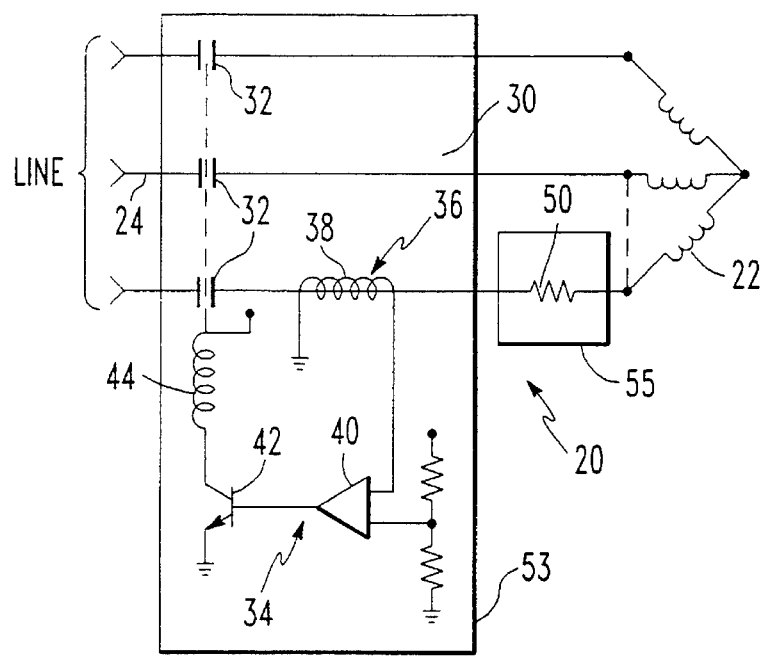
FIG. 1 is a schematic diagram showing a device according to the invention for protecting an electrical power distribution circuit.

Referring to the electrical schematic diagram of FIG. 1, a throttle device 20 according to the invention for protecting an electrical power distribution circuit coupling a load 22 to a power line 24, includes a contactor 30 having electrical switching contacts 32 in series with the load 22 and the line 24, and controllable switching means 34 coupled to open the contacts 32. Such contactor circuits are typically included in circuit breakers, motor starters and the like, and may be more or less sophisticated. At a minimum, the contactor circuit includes a current sensor 36 coupled to the controllable switching means 34, for opening of the contacts 32 upon occurrence of a high current fault in the power distribution circuit exceeding a predetermined threshold.

The contactor circuit may have a different threshold and different timing aspects for triggering the opening of the contacts, i.e., tripping, depending on the current threshold. In the schematic of FIG. 1, the high current fault threshold detection means includes a current sensing coil 38 for developing a signal representing the current level, coupled to a threshold detector 40 arranged to drive a switching transistor 42 and couple power to a relay coil 44 arranged to open the contacts 32 to decouple the load 22 from the line 24. It will be appreciated that how a high current level is detected and arranged to open the contacts 32 can have various different forms, this aspect of the device being conventional.

According to the invention, a protective resistive element 50 is disposed in series with the power distribution circuit, being coupled between the line 22 and the load 24 as shown in FIG. 1, to reduce the let-through current in the event of a short circuit or similar current fault, and thus to protect the contactor 30 and the respective conductors from damage. The resistive element 50 remains in series with the load 22, and therefore causes a slight drop in the voltage across the load 22 during normal operation, due to the resistance of the resistive element 50. However, the resistance of the resistive element 50 is minimal as compared to the resistance of the load 22. Therefore, during nominal conditions, most of the line voltage is applied to the load 22, and the resistive element 50 is not significantly heated.

On the other hand, if a short circuit or similar fault occurs on the load side of the power circuit relative to the contactor 30, a much smaller load resistance is seen by the power line 24. The current coupled through the circuit increases substantially until the contactor 30 operates to open the contacts 32. During this time, the resistance of the protective element 50 makes up the greater part of the resistance seen across the power line 24, the remainder being the series resistance of the conductors and any resistance associated with the short circuit or other current fault. Substantially the full power line voltage is applied to the protective resistive element 50. Although the current may be substantial, the insertion of the protective resistance element reduces the level of fault current and thereby protects the line conductors, the contactor 30, and the conductors between the contacts 32 and the point of the short circuit or other fault, shown in broken lines in FIG. 1. By limiting or throttling the current during the high current fault, the protective resistance 50 reduces the probability of a fire, severe erosion of the contacts 32 due to arcing, and the possibility that the contacts 32 may become welded together, leading to a trip of a circuit breaking element (not shown) located more proximal to the power source.

Figure 2:
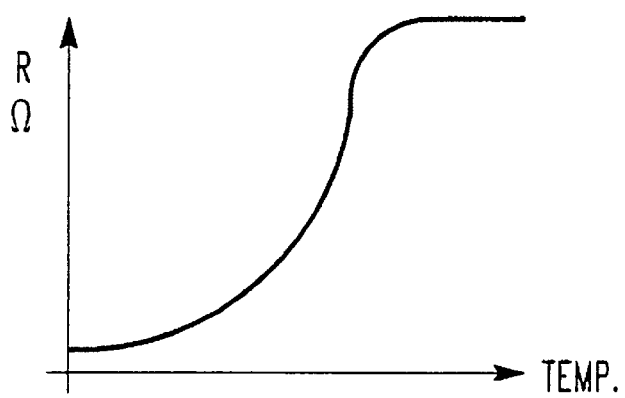
FIG. 2 is a plot of resistance vs. temperature for the resistive element shown in FIG. 1.

According to the invention, the resistive element 50 is thermally isolated from the contactor 30 and in particular from the controllable switching means 34 therein. The protective resistive element 50 can have a positive temperature coefficient, as shown by the plot in FIG. 2, such that its resistance increases with temperature, and is preferably disposed outside of the housing 53 for the contactor 30 such that any heat energy dissipated by resistive heating in the protective resistive element 50 is kept away from the contactor 30 and portions of the contactor or its housing 53 that could melt due to the heat or become damaged or inoperative due to the increase in temperature.

Figure 3:
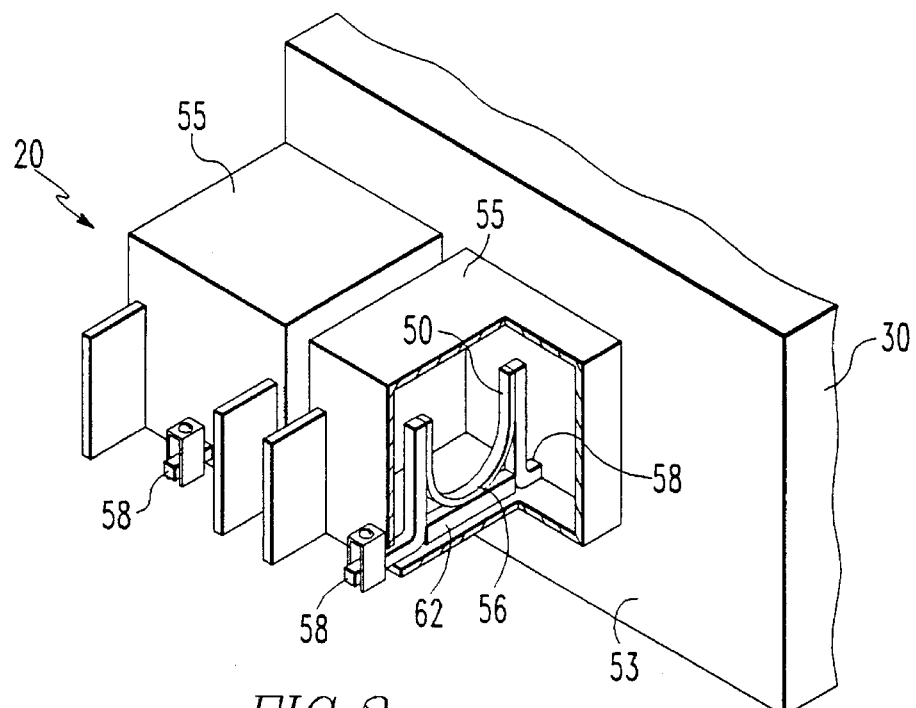
FIG. 3 is a perspective view showing the resistive element in a housing attached to the outside of a contactor housing.
Figure 4:
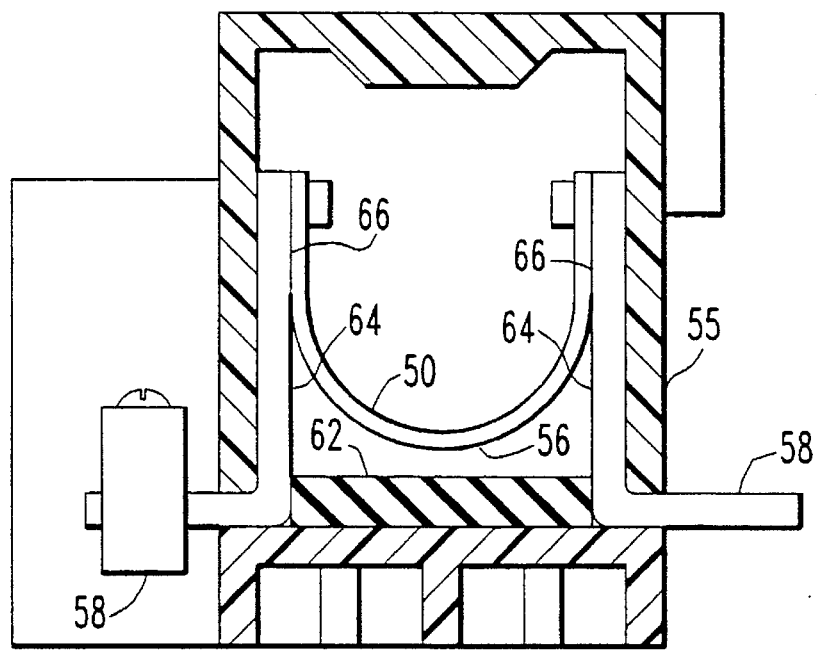
FIG. 4 is a schematic section view through the resistive element and housing as shown in FIG. 3.

Preferably, the resistive element 50 is disposed in a separate housing 55 of its own, as shown schematically in FIG. 1 and physically in FIGS. 3 and 4. The housing 55 for the resistive element 50 is external to the contactor housing 53, and either or both is made of a material that is unlikely to be damaged by heating to the levels encountered. In addition, an electrically non-conductive, thermally conductive heat transfer gel can be placed in the housing 55 for distributing the heat developed.

A suitable resistive element having a positive temperature coefficient comprises a strip of nickel-chromium alloy or "nichrome." This material is most commonly used in connection with resistive furnaces and the like, but also can be used in current throttle applications. The nichrome material is characterized by substantial increase in resistance with heating to a temperature at which the material radiates infrared energy. Nickel-chromium alloys form a solid solution at up to 30% chromium by weight. The chromium adds to the nickel enhanced strength, corrosion resistance, oxidation and hot corrosion resistance in addition to the beneficial positive temperature coefficient resistance characteristics mentioned. Other positive temperature coefficient materials are also possible, such as polymer materials including the Raychem Corp. POLYSWITCH material.

The nichrome strip resistive element 50 has a constant cross section along a length 56 bent along an arc. As shown in FIGS. 3–8, the strip 50 can be arranged in a number of configurations. In each case, however, the strip 50 is of uniform cross sectional dimension along its length, and is preferably homogeneous, so as to avoid points at which heating is concentrated and therefore subject to damage. By elongating the protective resistive element into an arc, the amount of resistance is increased and the area of heating is enlarged, as compared to a straight length of the same material.

Figure 5:
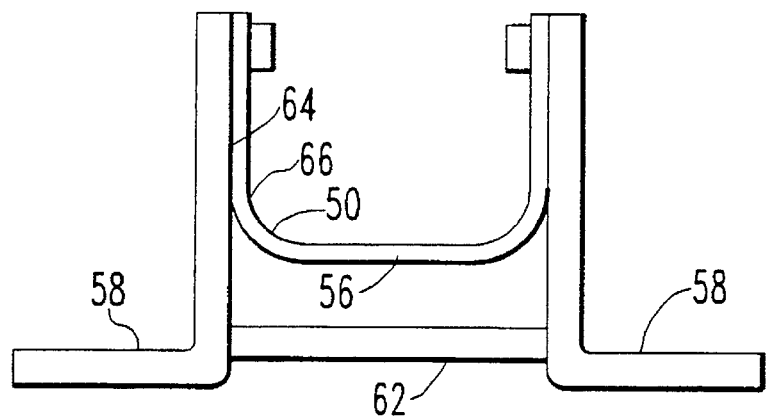
FIG. 5 is a schematic section view showing an alternative embodiment.

The arc 56 of protective resistive material is disposed between and electrically attached to two spaced leads 58. For supporting the leads 58, particularly during assembly of the device and its housing 55, an electrically insulating spacer 62 can be disposed between the leads 58, urging the leads 58 outwardly relative to the housing 55. In the embodiments of FIGS. 3–4 and 5, the arc 56 of resistive material depends downwardly in a U-shape along the inner-facing sides 64 of the leads 58, which are bent into a right angle. This arrangement is such that the area 66 of contact between the resistive material 50 and the leads 58 is relatively larger, and/or the resistive material resides close to the lead posts along the opposite legs of the U-shape. Accordingly, there is a certain thermal transfer from the resistive material 50 into the leads 58, and hence into the conductors (not shown) by which the protective device 20 is coupled into the circuit. There also may be electrical contact between the resistive material 50 and the leads 58 along an area from the upper ends of the leads downwardly, and as a result, not all the current through the protective device 20 passes through the entire length of the resistive material 50. The close proximity of the resistive material 50 to the leads 58 can be increased by squaring the U-shape somewhat as in FIG. 5, to maximize extraction of heat from the resistive material 50 by conduction, although the use of the resistive material 50 is not thereby maximized. Alternatively, the resistive material 50 can be spaced from the leads 58 to reduce thermal conduction while using the entire length of the resistive material 50.

Figure 6:
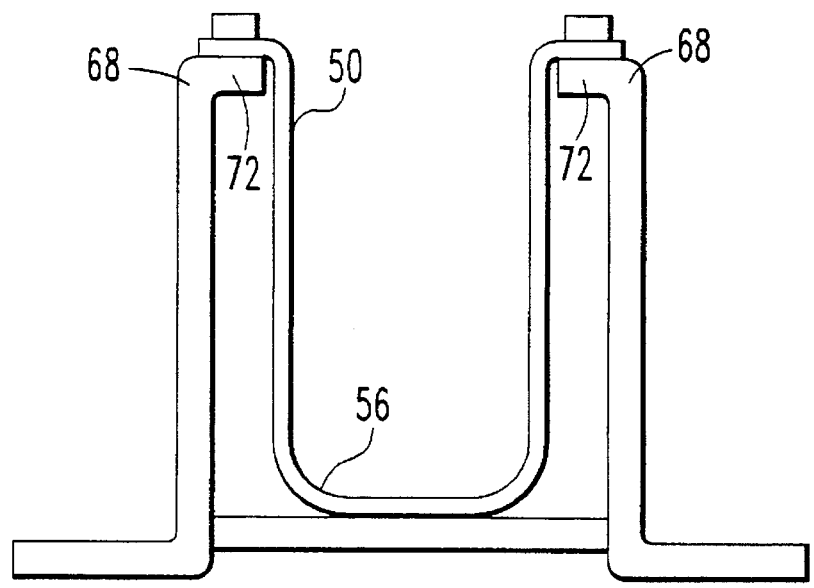
FIG. 6 is a schematic section view showing a further alternative embodiment.
Figure 7:
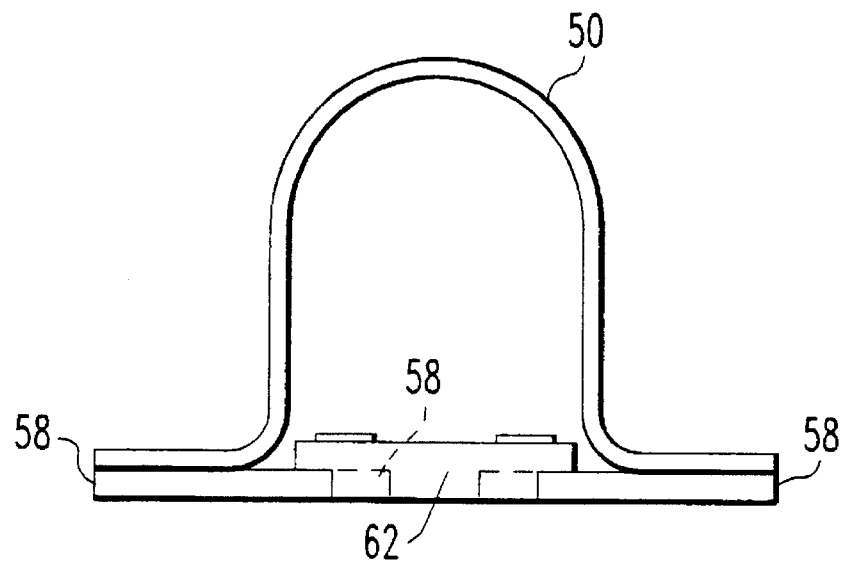
FIG. 7 is a schematic section view through another embodiment wherein the spacer of the terminal leads is a mounting insulator.
Figure 8:
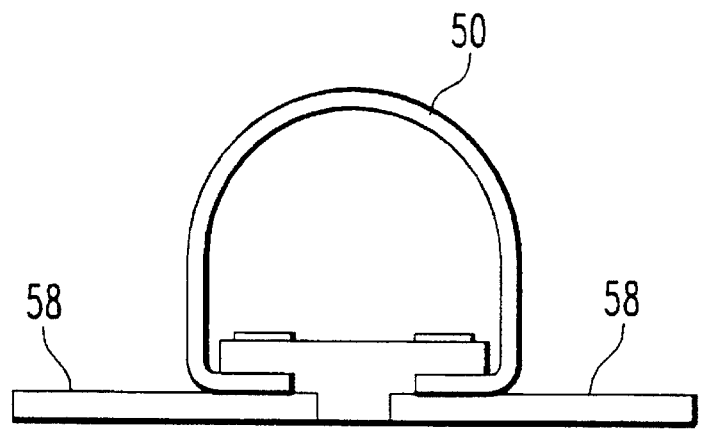
FIG. 8 is a section view through another embodiment.

In the embodiment of FIG. 6, the resistive material 50 is attached to the leads at inward facing bends 68 at the ends of the leads 58, forming connection tabs 72. In this arrangement a deep U-bend is possible, and the resistive material 50 remains spaced from the leads 58, and attached only at the extreme ends. The attachment is preferably made by brazing, and also can be made by welding, by screws or rivets, or by another technique suitable to obtain good electrical and mechanical connection in a manner that will survive heating.

The leads 58 attached to the resistive element 50 reside along the walls of the resistive element housing 55. Accordingly, the housing 55 is preferably made of a relatively high temperature material such as metal or a high temperature resin, e.g., phenolic. The resistive element housing 55 is external to the contactor housing 53 and coupled to the power distribution circuit on a load side of the contactor 30, and the leads 58 extend from an inside to an outside of the resistive element housing 55 and define means external of the housing 55 for coupling to the contactor 30 and to the load 22, respectively.

For throttling currents in power distribution circuits arranged, for example, to trip at a current threshold of 15 to 150 amps, the nichrome element comprises a strip having a thickness of about 0.020 to 0.078 inches and a width of about 0.375 to 0.50 inches. The smaller dimensions are applicable to the smaller current thresholds, and vice versa. The strip is bent into a substantially elliptical bend to provide the necessary length for the desired throttle resistance.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A device for protecting an electrical power distribution circuit coupling a load to a power line, comprising:

a housing;

a contactor disposed within said housing having electrical switching contacts in series with the load and the line, and controllable switching means disposed within said housing coupled to said contacts to open the contacts;

a current sensor disposed within said housing coupled to the controllable switching means for opening the contacts upon the occurrence of a current in the power distribution circuit exceeding a predetermined threshold; and resistive means disposed external of said housing in series with the power distribution circuit between the line and the load, the resistive means providing a voltage drop for limiting current during the occurrence of said current exceeding said predetermined threshold, said resistance means comprising heat dissipation means for uniformly dissipating heat therefrom.

2. The device according to claim 1 wherein said heat dissipation means is arcuate.

3. The device according to claim 1 wherein said heat dissipation means is arcuate and comprises a constant cross-section.

4. The device according to claim 1, wherein said heat dissipation means has a constant cross section.

5. The device according to claim 3, wherein said heat dissipation means is disposed between and electrically attached to two spaced leads, and further comprising an electrically insulating spacer between the leads.

6. The device according to claim 5, wherein said resistive mean comprising a nichrome element which comprises a strip having a thickness of about 0.020 to 0.078 inches and a width of about 0.375 to 0.50 inches, and wherein the predetermined threshold is about 15 to 150 amps.

7. The device according to claim 6, wherein the strip is substantially elliptical.

* * * * *